United States Patent
Silny et al.

(10) Patent No.: US 9,823,116 B2
(45) Date of Patent: Nov. 21, 2017

(54) GEOMETRIC CALIBRATION OF A REMOTE SENSOR

(75) Inventors: John F. Silny, Playa Vista, CA (US); Stephen J. Schiller, La Miranda, CA (US)

(73) Assignee: Raytheon Company, Waltham, MA (US)

(*) Notice: Subject to any disclaimer, the term of this patent is extended or adjusted under 35 U.S.C. 154(b) by 1177 days.

(21) Appl. No.: 13/593,302

(22) Filed: Aug. 23, 2012

(65) Prior Publication Data
US 2014/0058695 A1    Feb. 27, 2014

(51) Int. Cl.
| G01C 25/00 | (2006.01) |
| G01J 1/08 | (2006.01) |
| G01J 1/42 | (2006.01) |
| G06T 7/80 | (2017.01) |
| G01C 11/02 | (2006.01) |

(52) U.S. Cl.
CPC ............. *G01J 1/08* (2013.01); *G01C 25/00* (2013.01); *G01J 1/4228* (2013.01); *G06T 7/80* (2017.01); *G01C 11/02* (2013.01); *G06T 2207/10032* (2013.01); *G06T 2207/30181* (2013.01); *G06T 2207/30244* (2013.01)

(58) Field of Classification Search
CPC .......... G01J 1/4228; G01J 1/08; G01C 25/00; G01C 11/02; G06T 7/0018; G06T 2207/10032; G06T 2207/30244; G06T 2207/30181
USPC .......................................... 702/104; 356/445
See application file for complete search history.

(56) References Cited

U.S. PATENT DOCUMENTS

| 7,212,938 B2 * | 5/2007 | Mai | G01C 11/00 |
| | | | 702/104 |
| 2010/0032557 A1 * | 2/2010 | Schiller | G01J 1/02 |
| | | | 250/252.1 |

OTHER PUBLICATIONS

Helder et al., In flight characterization of spatial quality using point spread function, 2004, pp. 151-168.*
Lee et al., "Activities of calibration and validation for the KOMPSAT-2 MSC data", 2006, pp. 1-4.*
Schiller et al., "The specular array radiometric calibration (SPARC) method: a new approach for absolute vicarious calibration in the solar reflective spectrum", 2010, pp. 1-19.*

(Continued)

*Primary Examiner* — John Breene
*Assistant Examiner* — Eyob Hagos
(74) *Attorney, Agent, or Firm* — Burns & Levinson LLP; Joseph M. Maraia (57) ABSTRACT

Geometric calibration of an imaging system is performed by recording visible control points in a calibration image whose geometric properties are known and calibration coefficients can be derived utilizing an image processing system for transforming the recorded image into a geometric distortion-free image. Described are methods and systems for vicarious geometric calibration of a remote sensor that include a processor configured to receive image data collected at a remote sensor, the image data including a plurality of image elements each associated with a respective reflective mirror from a plurality of reflective mirrors located at respective know positions, determine, for each of the plurality of reflective mirrors, an image location in the image data and determine one or more figures of merit based on the image locations and the known positions for each of the plurality of reflective mirrors.

14 Claims, 8 Drawing Sheets

(56) References Cited

OTHER PUBLICATIONS

Bresnahan, et al.: "Absolute Geolocation Accuracy Evaluation of TerraSAR-X-1 Spotlight and Stripmap Imagery—study Results," Internet Citation, Apr. 2, 2009, pp. 1-21, XP007922133.
D. H. Lee, et al.: "Activities of calibration and validation for the KOMPSAT-2 msc data," Dec. 31, 2006, pp. 9-12, XP7922132, ISSN: 1768-9791.
Curtiss O. Davis, et al.: Ocean Phills hyperspectral imager: design, characterization, and calibration, Optics Express, Optical Society of America, Washington, DC, vol. 10, No. 4, Feb. 25, 2002, pp. 210-221, XP007922134, ISSN: 1094-4087.
Stephen J. Schiller, et al.: "The Specular Array Radiometric Calibration method: a new approach for absolute vicarious calibration in the solar reflective spectrum," Proceedings of SPIE, SPIE, US, vol. 7813, Aug. 26, 2010, p. 78130E-1, XP002685434, ISSN: 0277-786X.
Mary Pagnutti, et al.: "Targets, methods, and sites for assessing the in-flight spatial resolution of electro-optical data products," Canadian Journal of Remote Sensing, vol. 36, No. 5, Jan. 1, 2010, pp. 583-601, XP009171451, ISSN: 0703-8992.

* cited by examiner

GEOMETRIC CALIBRATION OF A REMOTE SENSOR

BACKGROUND

A critical element in the operation of air-borne and space-borne imaging systems is sensor calibration on the ground before launch or flight. However, it is entirely possible that physical conditions within the imaging system may change from the calibration laboratory setting in such a way so as to skew the calibration values. The calibration performance thus becomes suspect until validation after deployment. Indeed, to assure the most accurate operation, absolute calibration is necessary.

This is particularly true for geometric calibration of an imaging system which is required for making accurate geometric measurements from image data. Geometric calibration of an imaging system is performed by recording visible control points whose geometric properties are known and fitting a camera model to the positions of the control points in the calibration images. The camera model contains multiple parameters (also known as calibration coefficients) that must be derived from the calibration data in order to transform the recorded image into a geometric distortion-free image. There are two main kinds of parameters. First are the external parameters that account for orientation, position and motion of the imaging platform relative to the coordinate frame of the control points. For systems on-orbit, external parameters must also account for the curvature of the earth. Second, are the internal parameters that determine the projection of the control points from the imaging systems optical coordinate frame on to the coordinate frame of the image plane containing the radiation detection elements for generating the image pixels. This may include stitching together image components from multiple detector chips or multiple image planes. Once, the parameters are derived, the control points reveal systematic errors in the camera model, providing figures of merit for determining and trending calibration performance.

Previous art for operational control points rely on the intersection of roads, parking lot lines, sidewalks, roof corners on buildings or any high contrast geometric feature that can be associated with a ground position referenced to an absolute geodetic coordinate system and in turn provide a visible location in an image as a geometric calibration control point. However, such extended axial features have limited accuracy in pinpointing their location in a pixilated image. In laboratory testing, circular control points have proven to be optimal in geometric calibration since the centriod of the projected circles can be detected with high subpixel accuracy. However, once deployed, high contrast and well defined circular control points become unavailable and geometric accuracy knowledge becomes less attainable.

Thus, a need exists in the art for improved systems and methods for geometric calibration of remote sensors.

SUMMARY

Systems and methods for geometric calibration of remote sensors include technology that, generally, enables geometric calibration and performance validation of a remote sensor using a set of mirror reflectors (also referred to as reflective mirrors). The reflectors can be convex, concave, and/or flat and can be placed on the ground of the Earth or any other surface (e.g., Moon, satellite, etc.). The set of mirror reflectors are placed onto the surface in a particular arrangement to form an array. The technology includes a remote sensor (e.g., electro-optical sensor, infrared sensor, etc.) that receives reflected radiation from the set of mirror reflectors. The remote sensor determines an estimated location for each reflector in the set of mirror reflectors and compares the estimated location to the known location for the respective reflector. The technology advantageously enables geometric calibration and performance validation for remote sensors during operational use of the remote sensor (e.g., air-borne use, space-borne use, etc.), thereby increasing the functional use of the remote sensor and reducing the uncertainty with image data from the remote sensor.

For instance, a plurality of reflective mirrors are configured and arranged to reflect radiation from a source of radiation to the remote sensor. Each of the plurality of reflective mirrors is located at a known position. The remote sensor is configured to receive the radiation reflected from the plurality of reflective mirrors and store the received radiation as image data.

One approach is a system that provides geometric calibration of remote sensors. The system includes a processor configured to receive image data collected at a remote sensor. The image data includes a plurality of image elements each associated with a respective reflective mirror from a plurality of reflective mirrors located at respective known positions. The processor determines, for each of the plurality of reflective mirrors, an image location in the image data and determine one or more figures of merit based on the image locations and the known positions for each of the plurality of reflective mirrors. Using the determined information, the system: i) creates/updates geometric calibration coefficients (also known as camera model parameters) and/or ii) asses the performance of the remote sensor (e.g., how well it is geometrically calibrated).

Another approach is a remote sensor that provides geometric calibration. The remote sensor includes a sensor receiver configured to receive radiation reflected from a plurality of reflective mirrors. Each of the plurality of reflective mirrors is located at a known position. The remote sensor further includes an image location module configured to determine, for each of the plurality of reflective mirrors, an image location of the source of radiation. The remote sensor further includes an accuracy module configured to determine one or more figures of merit based on the image locations and the known positions for each of the plurality of reflective mirrors. Alternatively, the image location module and the accuracy module may be included in a processor located at the ground (e.g., associated with the location of the reflective mirrors or at a remote monitoring station). In this case, the remote sensor transmits data associated with the received radiation reflected from the reflective mirrors to the processor located at the ground. The transmitted data can be in the form, for example, of image data.

Another approach is a method for vicarious geometric calibration of a remote sensor. The method includes receiving image data collected at a remote sensor, where the image data includes data representative of radiation reflected from a plurality of reflective mirrors. Each of the plurality of reflective mirrors is located at a known position. The method further includes determining, for each of the plurality of reflective mirrors, an image location of the source of radiation. The method further includes determining one or more figures of merit based on the image locations and the known positions for each of the plurality of reflective mirrors. Using the determined information, the method: i) creates/updates geometric calibration coefficients and/or ii) asses the performance of the remote sensor (i.e., how well it is geometrically calibrated).

In other examples, any of the approaches above can include one or more of the following features.

In some examples, the processor is further configured to determine one or more calibration coefficients based on the one or more figures of merit. The one or more calibration coefficients are utilized to compensate for geometric distortions in received image data, and/or to compensate a pointing error in received image data.

In other examples, the processor is further configured to determine a pointing accuracy merit based on the one or more figures of merit. The pointing accuracy is indicative of geometric distortion of the remote sensor, pointing knowledge of the remote sensor, and/or pointing control of the remote sensor.

In some examples, the processor is further configured to determine, for each of the plurality of reflective mirrors, a center of the respective mirror location within the image data via a centroid function and determine one or more calibration coefficients, and/or one or more figures of merit for the remote sensor based on the center of the respective mirror location within the image data.

In other examples, the processor is further configured to determine, for each of the plurality of reflective mirrors, a center of the respective mirror location within the image data via a point spread function (PSF) model matching function and determine one or more calibration coefficients, one or more figures of merit, or any combination thereof for the remote sensor based on the center of the respective mirror location within the image data.

In some examples, the one or more figures of merit include an error in a center of an image, an error in an imaged area, an error in estimated absolute geo-position, an error in the distance between two or more points in the image, an error in geometric distortion, and/or an error in ortho-rectification residual.

In other examples, the known position of each of the plurality of reflective mirrors is an absolute geo-position.

In some examples, the known position of each of the plurality of reflective mirrors is a distance between the plurality of reflective mirrors.

In other examples, each of the plurality of reflective mirrors having a radius of curvature and a base diameter (also referred to as simply the "diameter"), the radius of curvature and the diameter indicative of the reflected intensity and reflector physical size.

In some examples, the processor is further configured to determine, for each of the plurality of reflective mirrors, the virtual image location of the source of radiation based on the radius of curvature, the diameter of the respective reflective mirror, angle between the source of radiation, the respective mirror, and the remote sensor, orientation between the source of radiation, the respective mirror, and/or the remote sensor and determine one or more figures of merits, and/or one or more calibration coefficients based on the image locations, the virtual image locations, and the known positions for each of the plurality of reflective mirrors.

In other examples, the plurality of reflective mirrors are located on earth surface or a satellite different from the satellite on which the remote sensor is located.

In some examples, the remote sensor is located on an airborne platform, an airship platform, or a space borne platform.

In other examples, the remote sensor is located on a ground based platform.

In some examples, the method further includes determining one or more calibration coefficients based on the one or more figures of merit, the one or more calibration coefficients utilized to compensate for geometric distortions in received image data, and/or to compensate a pointing error in received image data.

In other examples, the method further includes determining a pointing accuracy metric based on the one or more figures of merit, the pointing accuracy indicative of geometric distortion of the remote sensor, pointing knowledge of the remote sensor, and/or pointing control of the remote sensor.

In some examples, the method further includes determining, for each of the plurality of reflective mirrors, a center of the respective mirror location within the image data via a centroid function or a model matching function; and determining one or more calibration coefficients and/or one or more figures of merit for the remote sensor based on the center of the respective mirror location within the image data.

In other examples, the method further includes determining, for each of the plurality of reflective mirrors, a virtual image location of the source of radiation based on an angle between the source of radiation, the respective mirror, and the remote sensor, an orientation between the source of radiation, the respective mirror, and/or the remote sensor; and determining one or more figures of merits and/or one or more calibration coefficients based on the image locations, the virtual image locations, and the known positions for each of the plurality of reflective mirrors.

The geometric calibration techniques described herein can provide one or more of the following advantages. An advantage of the technology is that the geometric calibration utilizing known reflective mirrors enables calibration for the remote sensor during in-flight operations, thereby reducing errors with the remote sensor. Another advantage of the technology is that the geometric calibration utilizing known reflective mirrors enables calibration for the remote sensor during in-flight operations, thereby decreasing maintenance costs associated with retrieval of the remote sensor. Another advantage of the technology is that the relative location knowledge for each mirror in the plurality of mirrors can be utilized to determine the known location, thereby reducing the reliance on absolute positioning systems and increasing the functional uses of the technology. Yet another advantage of the technology is that it provides a low cost, reliable, and accurate solution for the calibration and performance evaluation of remote sensors. In addition, the technology provides: i) high-contrast, full spectrum targets and ii) easy-to-deploy and easy-to-maintain solutions for the calibration and performance evaluation of remote sensors.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The geometric calibration method and apparatus includes technology that, generally, utilizes a plurality of reflective mirrors to calibrate and/or validate sensor geo-location and/or distortion performance. Each of the plurality of reflective mirrors has a known location (e.g., a separation between one or more of the other reflective mirrors, an absolute geo-position, etc.). The sensor under test receives reflected radiation from the plurality of reflective mirrors and determines an estimated location for each mirror. The sensor can utilize the estimated location for each mirror and the known location for each mirror to determine if the sensor is geometrically calibrated. In other words, the technology can validate that if a sensor states that the sensor is viewing location A (e.g., One Broadway in New York City), the sensor is actually viewing location A. Alternatively, location A may be a GPS-type coordinate, for example, an absolute latitude/longitude coordinate. In another example, if an estimated distance between two points (e.g., points A and B) is 507 meters and the actual distance is 500 meters, the sensor may be calibrated such that the relative distance between the two points is measured accurately by the sensor. The technology advantageously enables a sensor to be remotely calibrated (e.g., air-borne, space-borne, etc.), thereby reducing maintenance costs and validating in-flight performance. The technology advantageously enables a sensor to be remotely validated, thereby increasing the confidence of the image data from the sensor.

Figure 1:
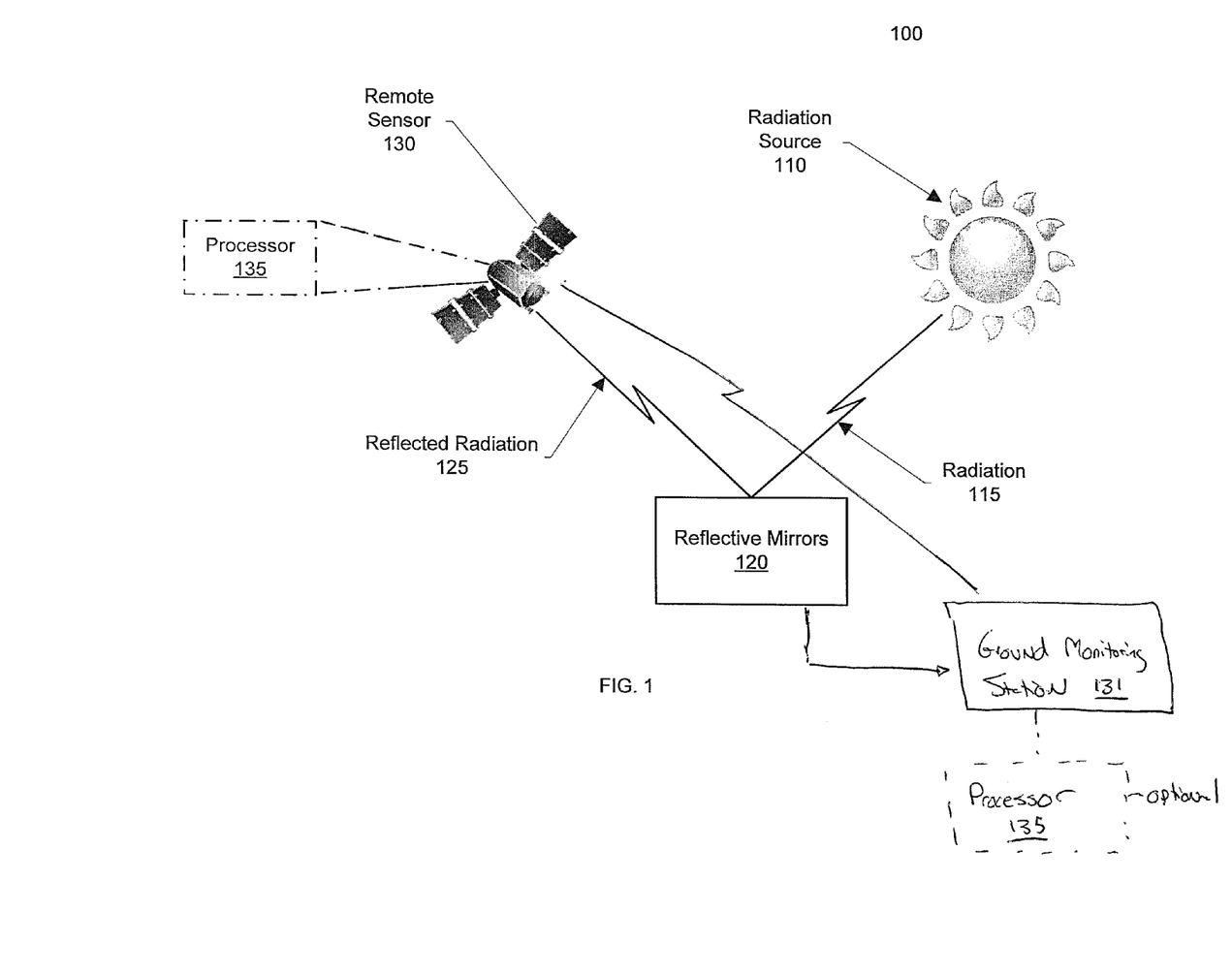
FIG. 1 is a diagram of an exemplary geometric calibration environment.

FIG. 1 is a diagram of an exemplary geometric calibration environment 100. The environment 100 includes a radiation source 110 (in this example, the sun), a plurality of reflective mirrors 120, and a remote sensor 130. In some examples, the remote sensor 130 includes a processor 135. Although, the processor 135 is illustrated as being included in the remote sensor 130, it should be noted that, in other examples, the processor may located on another system (e.g., inter-connected calibration system, remote calibration system, on-ground monitoring system (e.g., station) 131, etc.). In such a scenario, the sensor 130 collects images when viewing the reflector targets (e.g., the calibration system) and then transmits the collected data to the ground for processing. The ground processing assesses sensor performance and creates new calibration coefficients as necessary.

It should also be noted that there are other potential radiation sources other than the sun. For example, the radiation source may be a laser that is used to illuminate the mirrors. In fact, any source of light with a small angular size such as the sun, moon, streetlight, spotlight etc. or even lidar systems (active sensors) illuminating the mirror creating a virtual image observable by the imaging sensor under calibration can be located by a singular coordinate (x,y) point and utilized for the geometric calibration as illustrated below in FIGS. 3A, 3B and 3C as long as the illumination geometry is known. By being able to assume a point source illumination, the processor 135 is able to use a generalized approach in determining the x,y coordinates of the control point.

Further, extended sources such as the down welling radiation from the hemispherical sky can also be radiation sources illuminating a circular mirror that can establish a control point (as would be the case under cloudy sky conditions with an aircraft flying under the clouds which is done frequently). In this case, the (x,y) location is the physical center of the mirror surface (because it simply appears as a circular/elliptical disk) and is not be treated as a point virtual image.

In addition, a source of radiation is not required. In particular, the mirrors 120 can also be good control points in the thermal infrared situation with no illuminating source (e.g., where sunlight is too weak to be observed compared to thermal emission of the environment). In this case, the metallic surface of the specular mirrors have very low emissivity compared to the background and; thus, appear as dark spots which make good ground control points for the geometric calibration of thermal infrared imaging systems (because they can be centroided in the same way as bright points). The position of the control point is the physical center of the mirror as with the hemispherical sky illumination. This capability allows the same geometric target to be used for the geometric calibration of sensors over the full electromagnetic spectrum, from the visible to the far infrared.

As illustrated in FIG. 1, the radiation source 110 emits radiation 115. The plurality of mirrors 120 reflects the radiation 115, and the reflected radiation 125 is received by the remote sensor 130. In other words, the plurality of reflective mirrors 120 are arranged to reflect the radiation 115 from the source of radiation (also referred to as radiation source 110) to the remote sensor 130. Each of the plurality of reflective mirrors 120 is located at a known position (e.g., known absolute position, known relative position to each other, etc.). For example, a mirror is located at a specified latitude/longitude. As another example, a mirror is located twenty-five meters from mirror B and thirty-five meters from mirror C.

The remote sensor 130 receives the radiation (also referred to as reflected radiation 125) reflected from the plurality of reflective mirrors 120. The remote sensor 130 stores the received radiation as image data (e.g., converts the received radiation into the image data, stores the image data, transmits the image data, etc.). The processor 135 determines, for each of the plurality of reflective mirrors, an image location in the image data (e.g., pinpoint location for the center of the mirror, combination of a virtual image of the radiation source and the pinpoint location for the center, etc.).

The processor 135 determines one or more figures of merit based on the image locations and the known positions for each of the plurality of reflective mirrors. The figures of merits can include a pointing accuracy (e.g., an error in the center of an image), a coverage accuracy (e.g., an error in the imaged area), and/or a geo-location accuracy (e.g., an error in estimated absolute position of each pixel). In other words, the processor 135 can determine if the remote sensor 130 is accurately imaging the location that the remote sensor 130 is directed towards imaging. The determination of the one or more figures of merit enables the remote sensor 130 and/or the operator of the remote sensor 130 to validate the performance during operation in the flight environment (e.g., air-borne operation, space-borne operation, etc.), thereby reducing maintenance costs associated with calibrating the remote sensor 130 and improving sensor performance.

In some examples, the processor 135 determines one or more calibration coefficients (e.g., adjust imaged area by five meters south, adjust targeting by ten degrees south, apply non-linear algorithm to compensate for sensor optical distortion, etc.) based on the one or more figures of merit. The one or more calibration coefficients are utilized to compensate for geometric distortions in received image data and/or to compensate a pointing error in received image data. The one or more calibration coefficients can advantageously be utilized to correct distortion errors, thereby enhancing sensor performance.

In other examples, the processor 135 determines a pointing accuracy merit (e.g., 99% accurate, off by ten meters due south, etc.) based on the one or more figures of merit. The pointing accuracy is indicative of geometric distortion of the remote sensor, pointing knowledge of the remote sensor, and/or pointing control of the remote sensor.

In some examples, the processor 135 determines, for each of the plurality of reflective mirrors, a center of the respective mirror location within the image data via a centroid function (e.g., 2d centroid to estimate the reflector's center point in image data, etc.). In other examples, the processor 135 determines one or more calibration coefficients and/or one or more figures of merit for the remote sensor based on the center of the respective mirror location within the image data. The processor 135 utilizes the center of the mirror location for the image location of the reflected radiation 125.

In some examples, the processor 135 determines, for each of the plurality of reflective mirrors, a center of the respective mirror location within the image data via a point spread function (PSF) model matching function (e.g., use a priori knowledge of the PSF shape and use spatial offset grid search to find reflector center in image data, etc.). In other examples, the processor 135 determines one or more calibration coefficients and/or one or more figures of merit for the remote sensor based on the center of the respective mirror location within the image data.

In some examples, the one or more figures of merit include an error in a center of an image, an error in an imaged area, an error in estimated absolute geo-position, an error in the distance between two or more points in the image, an error in geometric distortion, and/or an error in ortho-rectification residual. In other examples, the known position of each of the plurality of reflective mirrors is an absolute geo-position (e.g., global positioning satellite (GPS) location, latitude/longitude coordinates, etc.). In some examples, the known position of each of the plurality of reflective mirrors is a distance between the plurality of reflective mirrors (e.g., mirror A is ten meters from mirror B, mirror C is five meters due south from position Z, etc.).

In other examples, each of the plurality of reflective mirrors has a radius of curvature (e.g., one meter, two meters, etc.) and a diameter (e.g., three meters, two meters, etc.). The radius of curvature and the diameter are indicative of a virtual image location of the source of radiation.

In some examples, the processor 135 determines, for each of the plurality of reflective mirrors, the virtual image location of the source of radiation based on the radius of curvature, the diameter of the respective reflective mirror, angle between the source of radiation, the respective mirror, and the remote sensor, and/or orientation between the source of radiation, the respective mirror, and the remote sensor. In other examples, the processor 135 determines one or more figures of merits and/or one or more calibration coefficients based on the image locations, the virtual image locations, and the known positions for each of the plurality of reflective mirrors.

Figure 2A:
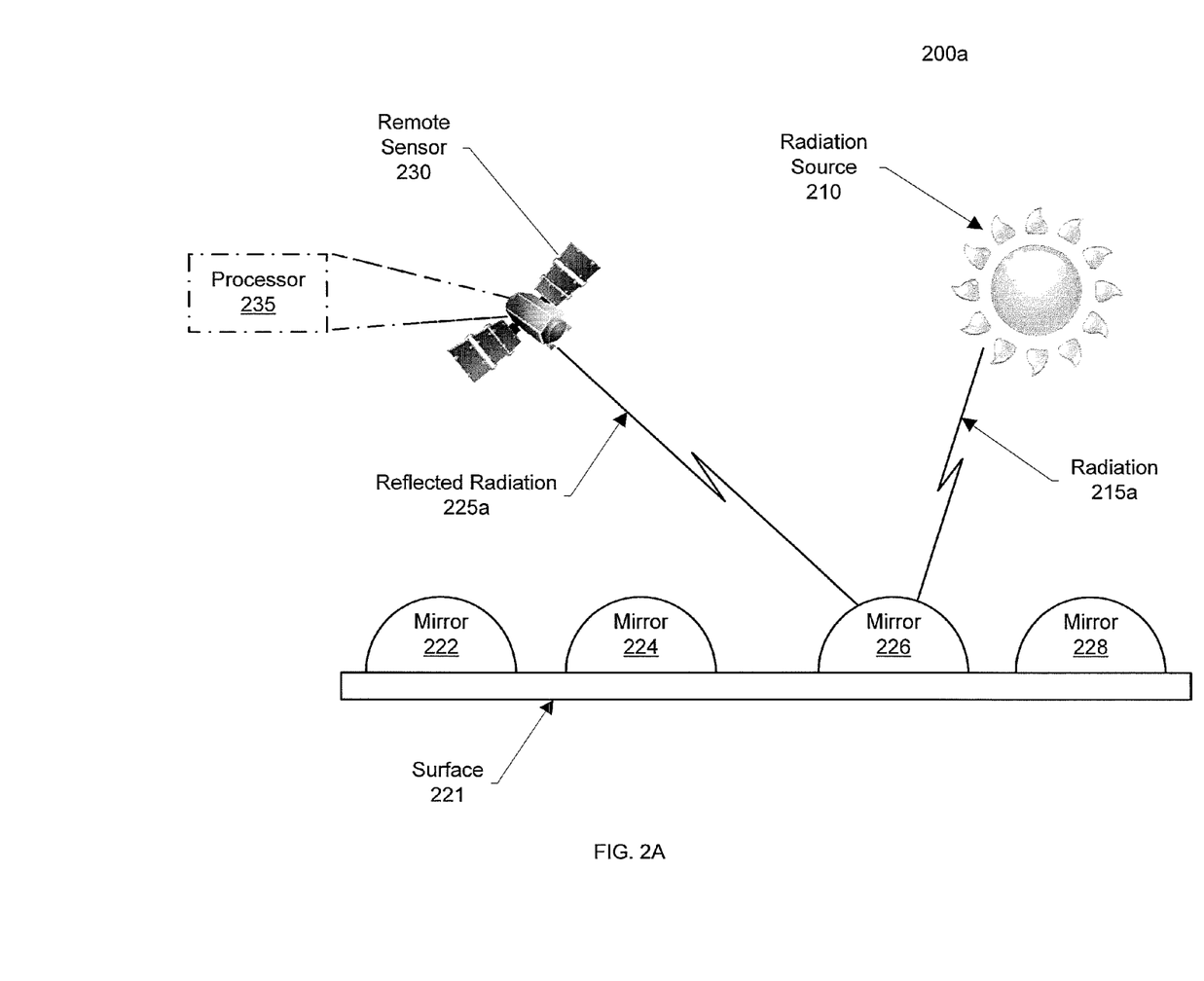
FIGS. 2A and 2B are diagrams of an exemplary geometric calibration environment.
Figure 2B:
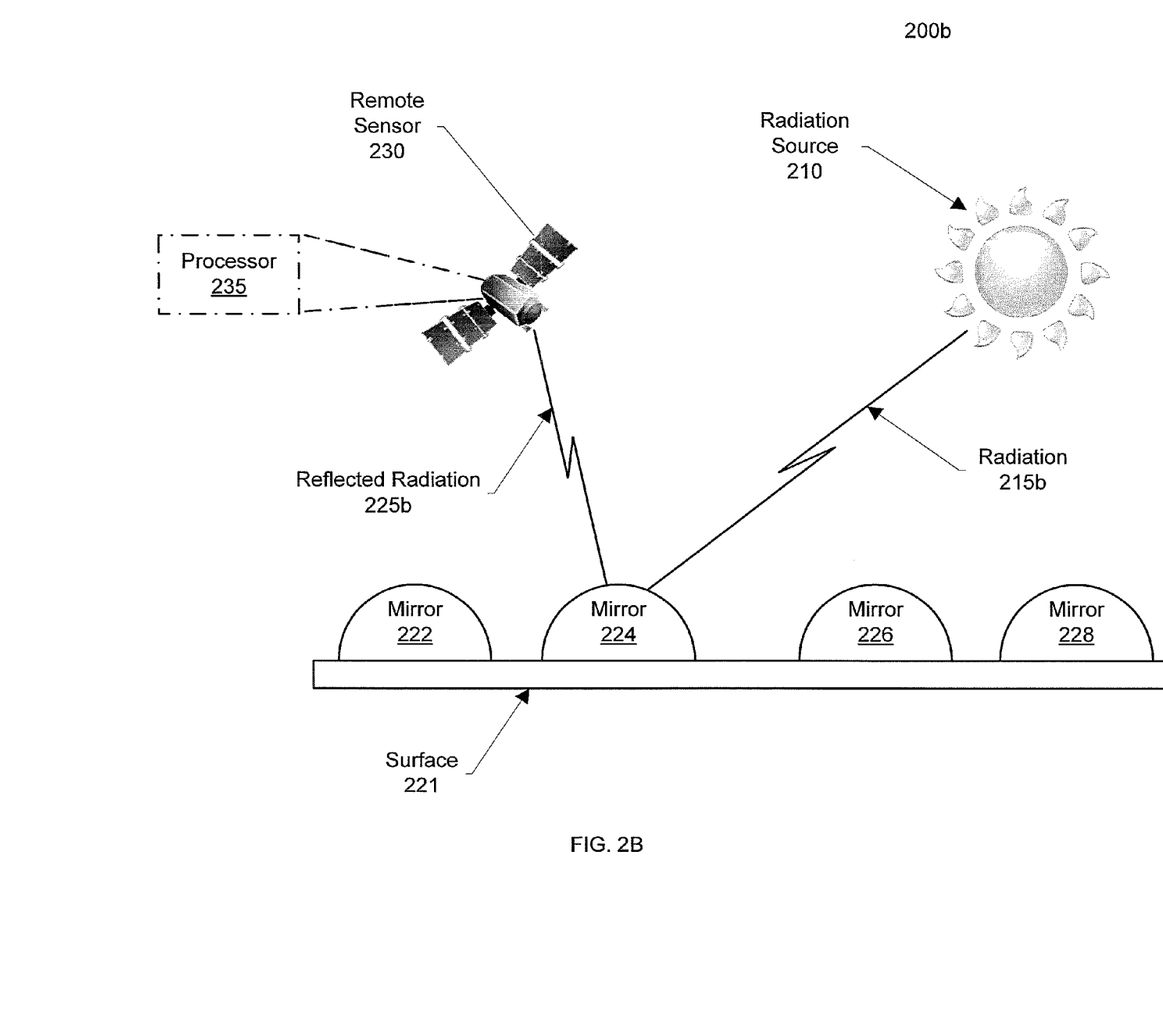

FIGS. 2A-2B are diagrams of an exemplary geometric calibration environment 200a and 200b. The environment 200 includes a radiation source 210 (in this example, the sun), a plurality of reflective mirrors 222, 224, 226, and 228, and a remote sensor 230. The plurality of reflective mirrors 222, 224, 226, and 228 are on a surface 221 (e.g., earth, a satellite, moon, etc.). In some examples, the remote sensor 230 includes a processor 235. In other examples, the processor is located on another system (e.g., inter-connected calibration system, remote calibration system, etc.).

As illustrated in FIG. 2A, the radiation source 210 emits radiation 215a. The mirror 226 reflects the radiation 215a, and the reflected radiation 225a is received by the remote sensor 230. In other words, the mirror 226 is arranged to reflect the radiation 215a from the source of radiation (also referred to as radiation source 210) onto the remote sensor 230. In some embodiments, a source of radiation is not required. For example, in the thermal infrared at night, the mirrors will appear as dark spots with image data due to having lower emissivity relative to the background. The mirror 226 is located at a known position (e.g., known absolute position, known relative position to each other, etc.). In this example, the mirror 226 is ten meters due south of the mirror 224.

As illustrated in FIG. 2B, the radiation source 210 emits radiation 215b. The mirror 224 reflects the radiation 215b, and the reflected radiation 225b is received by the remote sensor 230. In other words, the mirror 224 is arranged to reflect the radiation 215b from the source of radiation (also referred to as radiation source 210) onto the remote sensor 230. The mirror 224 is located at a known position (e.g., known absolute position, known relative position to each other, etc.). In this example, the mirror 224 is ten meters due north of the mirror 226.

The remote sensor 130 receives the radiation (also referred to as reflected radiation 225a and 225b) reflected from the plurality of reflective mirrors 226 and 224, respectively. The remote sensor 230 stores the received radiation as image data. The processor 235 determines, for each of the plurality of reflective mirrors, an image location in the image data. As noted above, the processor 235 may be located in an on-ground facility. Thus, the sensor 230, in such a situation, transmits the image data to the processor 235 at the on-ground facility. In this example, the image location of the mirror 224 is eleven meters due north of the image location of the mirror 226, even though the actual location is only ten meters. The processor 235 determines one or more figures of merit based on the image locations and the known positions for the mirrors 224 and 226. In this example, the processor 235 can utilize the mis-placement of one meter for the location of mirrors 224 and 226 to correct the placement of the image data (e.g., transmit corrected location parameters to an operator, update a database entry with the corrected location parameters, correct the navigation location of the remote sensor, etc.).

Figure 3A:
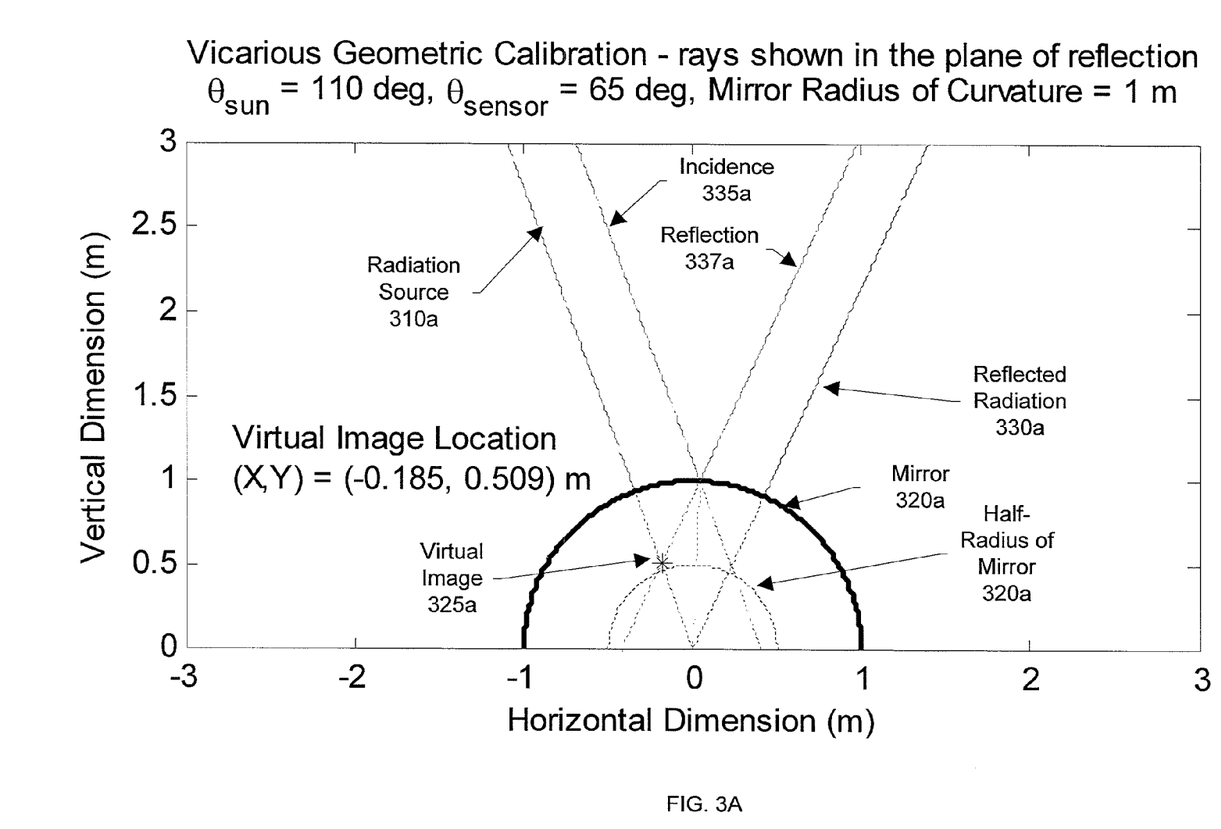
FIGS. 3A, 3B, and 3C are diagrams of exemplary mirrors.

FIG. 3A is a diagram of exemplary mirror 320a. The mirror 320a receives radiation from a radiation source 310a and reflects the received radiation, reflected radiation 330a. A virtual image 325a of the image location is formed based on a half-radius of the mirror 320a, an incidence line 335a of the radiation source 310a, and a reflection 337a of the reflected radiation 330a. In this example, the radius of curvature (one meter) and the diameter (two meters) of the mirror is indicative of a virtual image location of the source of radiation. For the illustrative small radiation source-target-sensor angles, the virtual image 325a is located at the half-radius of the mirror 320a, which is consistent with the paraxial theory of optics.

Figure 3B:
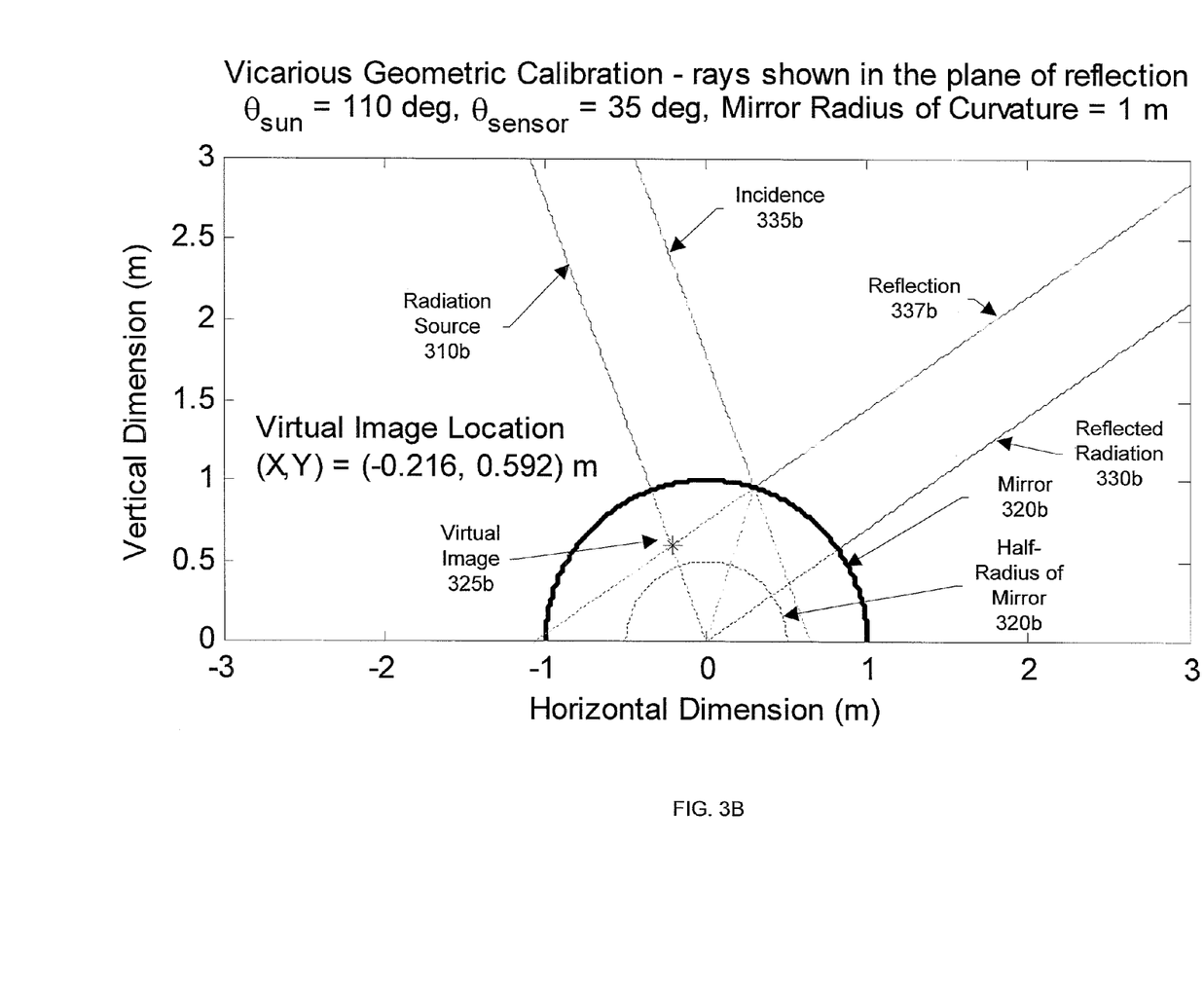

FIG. 3B is a diagram of exemplary mirror 320b. The mirror 320b receives radiation from a radiation source 310b and reflects the received radiation, reflected radiation 330b. A virtual image 325b of the image location is formed based an incidence line 335b of the radiation source 310b and a reflection 337b of the reflected radiation 330b. In this example, the radius of curvature (one meter) and the diameter (two meters) of the mirror is indicative of a virtual image location of the source of radiation. For the larger radiation source-target-sensor angles, the virtual image 325b departs from the half-radius of the mirror 320b (i.e. begins to violate the paraxial approximation).

Figure 3C:
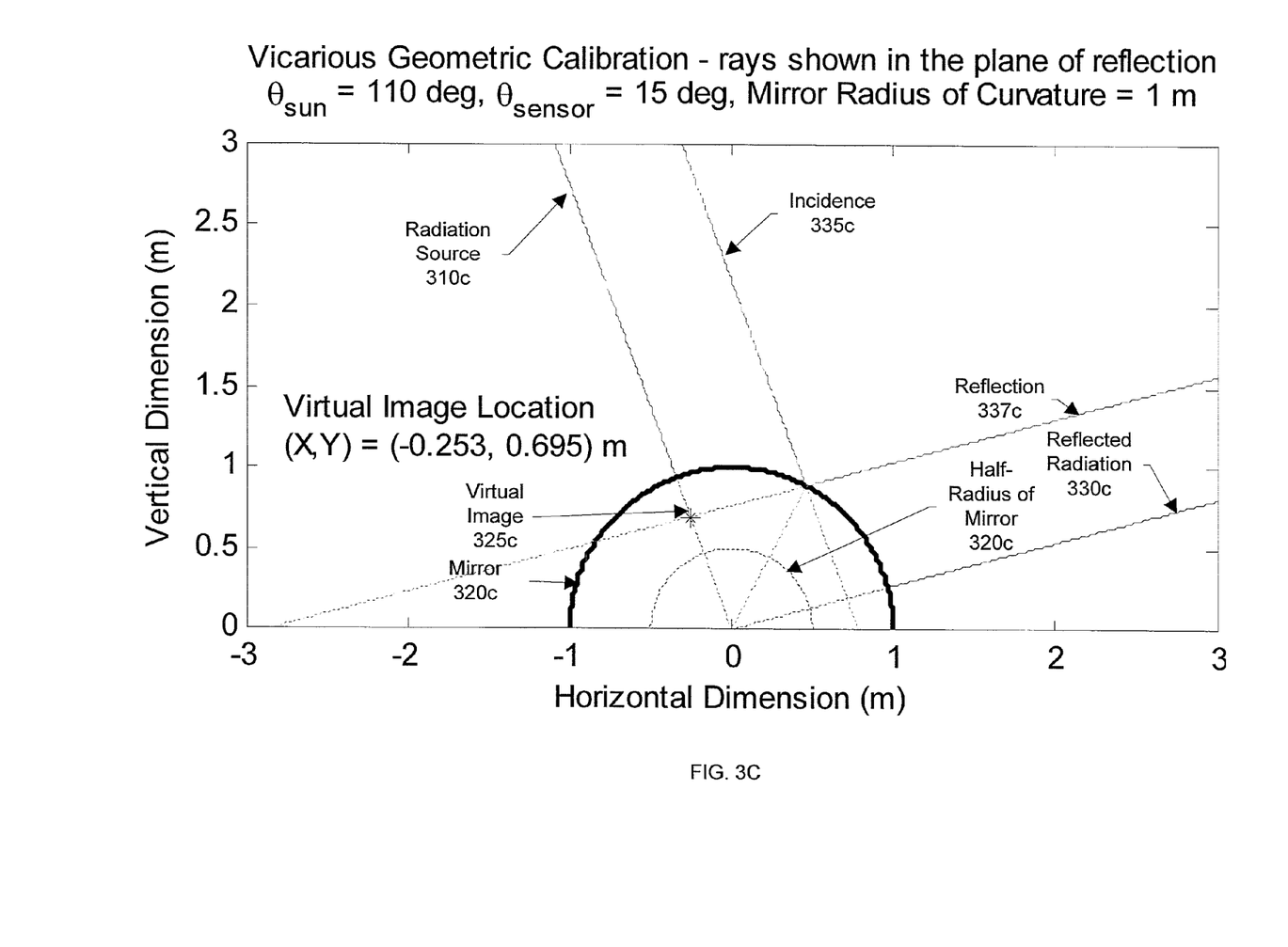

FIG. 3C is a diagram of exemplary mirror 320c. The mirror 320c receives radiation from a radiation source 310c and reflects the received radiation, reflected radiation 330c. A virtual image 325c of the image location is formed based an incidence line 335c of the radiation source 310c and a reflection 337c of the reflected radiation 330c. In this example, the radius of curvature (one meter) and the diameter (two meters) of the mirror is indicative of a virtual image location of the source of radiation. For the larger radiation source-target-sensor angles, the virtual image 325c departs from the half-radius of the mirror 320c (i.e. the large departure from the paraxial assumptions leads to a violation of the paraxial predictions).

Figure 4:
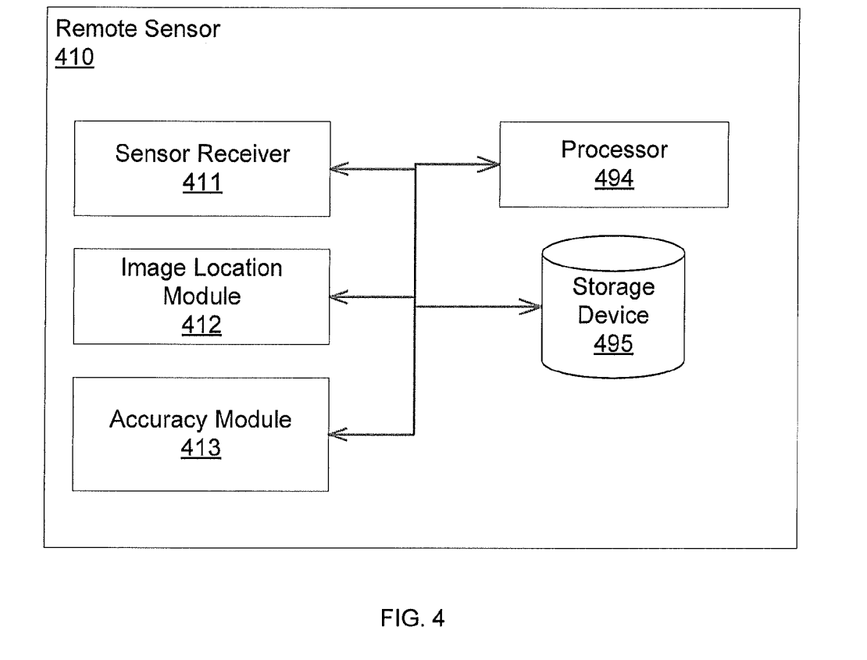
FIG. 4 is a diagram of an exemplary remote sensor.

FIG. 4 is a diagram of an exemplary remote sensor 410. The remote sensor 410 includes a sensor receiver 411, an image location module 412, an accuracy module 413, a processor 494 (the image location module 412, accuracy module 413, and processor 494 may be located at an on-ground facility 131), and a storage device 495. The modules and devices described herein can, for example, utilize the processor 494 to execute computer executable instructions and/or include a processor to execute computer executable instructions (e.g., an encryption processing unit, a field programmable gate array processing unit, etc.). It should be understood that the remote sensor 410 can include, for example, other modules, devices, and/or processors known in the art and/or varieties of the illustrated modules, devices, and/or processors.

The sensor receiver 411 receives radiation reflected from a plurality of reflective mirrors. Each of the plurality of reflective mirrors is located at a known position.

The image location module 412 determines, for each of the plurality of reflective mirrors, an image location of the source of radiation.

The accuracy module 413 determines one or more figures of merit based on the image locations and the known positions for each of the plurality of reflective mirrors.

In some examples, the plurality of reflective mirrors are located on earth surface or a satellite different from the satellite on which the remote sensor is located.

In other examples, the remote sensor is located on an airborne platform, an airship platform, or a space borne platform. In some examples, the remote sensor is located on a ground based platform.

The storage device 495 stores image data and/or any other information (e.g., metric, coefficient, etc.). The storage device 495 can include a plurality of storage devices and/or the remote sensor 410 can include a plurality of storage devices (e.g., a image storage device, a position storage device, etc.). The storage device 495 can include, for example, long-term storage (e.g., a hard drive, a tape storage device, flash memory, etc.), short-term storage (e.g., a random access memory, a graphics memory, etc.), and/or any other type of computer readable storage.

Figure 5:
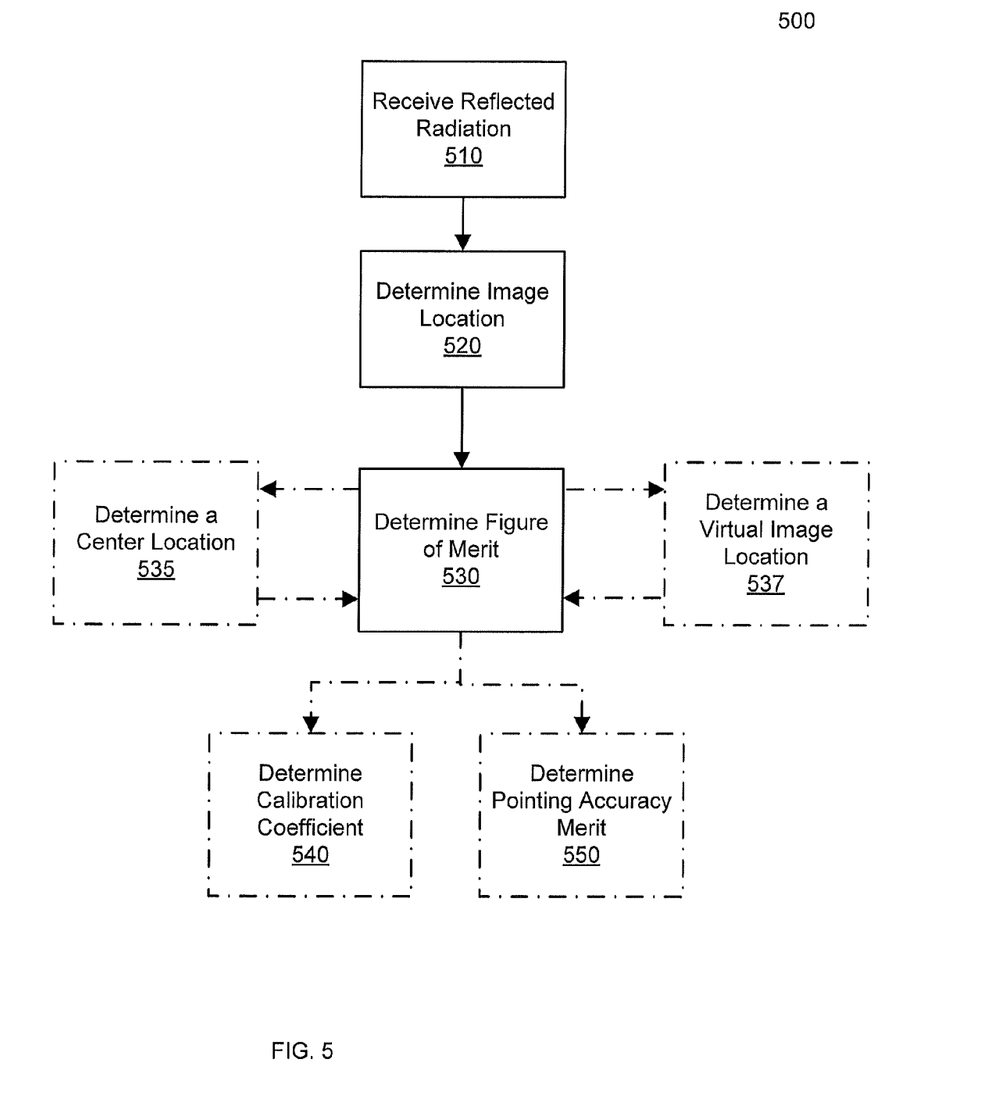
FIG. 5 is a flowchart of an exemplary geometric calibration method.

FIG. 5 is a flowchart of an exemplary geometric calibration method 500 of, for example, the remote sensor 410 of FIG. 4. The sensor receiver 411 receives (510) radiation reflected from a plurality of reflective mirrors. Each of the plurality of reflective mirrors is located at a known position (e.g., known relative locations from each other, absolute location, etc.). The image location module 412 determines (520), for each of the plurality of reflective mirrors, an image location of the source of radiation. The accuracy module 413 determines (530) one or more figures of merit based on the image locations and the known positions for each of the plurality of reflective mirrors.

In some examples, the accuracy module 413 determines (540) one or more calibration coefficients based on the one or more figures of merit. The one or more calibration coefficients are utilized to compensate for geometric distortions in received image data and/or to compensate a pointing error in received image data.

In other examples, the accuracy module 413 determines (550) a pointing accuracy merit based on the one or more figures of merit. The pointing accuracy is indicative of geometric distortion of the remote sensor, pointing knowledge of the remote sensor, and/or pointing control of the remote sensor.

In some examples, the accuracy module 413 determines (535), for each of the plurality of reflective mirrors, a center of the respective mirror location within the image data via a centroid function or a model matching function. In other examples, the accuracy module determines (530) one or more calibration coefficients and/or one or more figures of merit for the remote sensor based on the center of the respective mirror location within the image data.

In other examples, the accuracy module 413 determines (537), for each of the plurality of reflective mirrors, a virtual image location of the source of radiation based on an angle between the source of radiation, the respective mirror, and the remote sensor and/or an orientation between the source of radiation, the respective mirror, and the remote sensor. In some examples, the accuracy module 413 determines (530) one or more figures of merits and/or one or more calibration coefficients based on the image locations, the virtual image locations, and the known positions for each of the plurality of reflective mirrors.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A system for vicarious geometric calibration of an airborne or space-borne sensor, comprising:
    an airborne or space-born sensor for imaging a remote surface;
    a processor operatively associated with the sensor;
    a plurality of reflective mirrors positioned on the remote surface in a particular arrangement to form an array having a predetermined geometric configuration, the geometric configuration representing an absolute coordinate system, each of the plurality of reflective mirrors being located at a predetermined absolute position of the reflective mirror and a predetermined relative position of the reflective mirror with respect to the other reflective mirrors of the plurality of reflective mirrors; and
    a storage device operatively associated with the processor, wherein the storage device stores information for the predetermined positions of the plurality of mirrors under the absolute coordinate system of the image sensor;
    wherein the sensor is configured for imaging the remote surface including a region thereof containing the plurality of mirrors in order to produce one or more calibration images, wherein the plurality of mirrors provide visible control points in the one or more calibration images with predetermined absolute and relative geometric properties which can be utilized for geometric calibration of the sensor;
    wherein the processor is configured to: (i) receive image data from the sensor, the image data including the one or more calibration images and coordinate information for the one or more calibration images based on a coordinate system of the image sensor; (ii) process the image data to determine an estimated position for each of the plurality of mirrors under the coordinate system of the image sensor; (iii) compare the estimated positions of the plurality of mirrors under the coordinate system of the image sensor to the predetermined positions of the plurality of mirrors under the absolute coordinate system so as to determine geometric distortions in the calibration images; (iv) determine calibration coefficients for compensating for the geometric distortions by transforming the coordinate system of the image sensor into the absolute coordinate system; and (v) apply the calibration coefficients to transform subsequent image data.

2. The system of claim 1, wherein the processor is further configured to determine a pointing accuracy merit, the pointing accuracy indicative of geometric distortion of the sensor, pointing knowledge of the sensor, pointing control of the sensor, or any combination thereof.

3. The system of claim 1, wherein the processor is further configured to:
    determine, for each of the plurality of reflective mirrors, a center of the respective mirror location within the image data via a centroid function, and
    determine the estimated position for each of the plurality of mirrors under the coordinate system of the image sensor based on the center of the respective mirror location within the image data.

4. The system of claim 1, wherein the processor is further configured to:
    determine, for each of the plurality of reflective mirrors, a center of the respective mirror location within the image data via a model matching function, and
    determine the estimated position for each of the plurality of mirrors under the coordinate system of the image sensor based on the center of the respective mirror location within the image data.

5. The system of claim 1, wherein the processor is further configured to determine one or more figures of merit based on the geometric distortions in the calibration images, wherein the one or more figures of merit comprise an error in a center of an image, an error in an imaged area, an error in estimated absolute geo-position, an error in the distance between two or more points in the image, an error in geometric distortion, an error in ortho-rectification residual, or any combination thereof.

6. The system of claim 1, wherein the predetermined absolute position of each of the plurality of reflective mirrors is an absolute geo-position.

7. The system of claim 1, wherein the predetermined relative position of each of the plurality of reflective mirrors comprises a distance between the plurality of reflective mirrors.

8. The system of claim 1, wherein each of the plurality of reflective mirrors has a radius of curvature and a diameter, the radius of curvature and the diameter being indicative of a virtual image location of a source of radiation.

9. The system of claim 8, wherein the processor is further configured to:
    for each of the plurality of reflective mirrors, determine:
        (i) the virtual image location of the source of radiation based on the radius of curvature, (ii) the diameter of the respective reflective mirror, (iii) an angle between a first vector extending from the source of radiation to the respective mirror and a second vector extending from the respective mirror to the sensor, (iv) an orientation of the source of radiation, the respective mirror, or the sensor, or (v) any combination of (i) through (iv) above, and determine the calibration coefficients based on the estimated positions of the plurality of mirrors under the coordinate system, the virtual image locations, and the predetermined absolute and relative positions for each of the plurality of reflective mirrors.

10. A method for vicarious geometric calibration of a remote sensor, comprising:

providing an airborne or space-born sensor for imaging a remote surface;

providing a plurality of reflective mirrors positioned on the remote surface in a particular arrangement to form an array having a predetermined geometric configuration representing an absolute coordinate system, each of the plurality of reflective mirrors being located at a predetermined absolute position of the reflective mirror and a predetermined relative position of the reflective mirror with respect to the other reflective mirrors of the plurality of reflective mirrors;

storing in a storage device operatively associated with a processor information for the predetermined positions of the plurality of mirrors under the absolute coordinate system of the image sensor;

using the sensor to image the remote surface including a region thereof containing the plurality of mirrors in order to produce one or more calibration images, wherein the plurality of mirrors provide visible control points in the one or more calibration images with predetermined absolute and relative geometric properties which can be utilized for geometric calibration of the sensor;

receiving image data from the sensor, the image data including the one or more calibration images and coordinate information for the one or more calibration images based on a coordinate system of the image sensor; and using the processor to:

process the image data to determine an estimated position for each of the plurality of mirrors under the coordinate system of the image sensor;

compare the estimated positions of the plurality of mirrors under the coordinate system of the image sensor to the predetermined positions of the plurality of mirrors under the absolute coordinate system so as to determine geometric distortions in the calibration images;

determine calibration coefficients for compensating for the geometric distortions by transforming the coordinate system of the image sensor into the absolute coordinate system; and apply the calibration coefficients to transform subsequent image data.

11. The method of claim 10, further comprising determining a pointing accuracy merit, the pointing accuracy indicative of geometric distortion of the sensor, pointing knowledge of the sensor, pointing control of the sensor, or any combination thereof.

12. The method of claim 10, further comprising:

determining, for each of the plurality of reflective mirrors, a center of the respective mirror location within the image data via a centroid function or a model matching function; and determining the estimated position for each of the plurality of mirrors under the coordinate system of the image sensor based on the center of the respective mirror location within the image data.

13. The method of claim 10, further comprising:

determining, for each of the plurality of reflective mirrors, a virtual image location of a source of radiation based on an angle between a first vector extending from the source of radiation to the respective mirror and a second vector extending from the respective mirror to the sensor.

14. The method of claim 13, further comprising determining the calibration coefficients, based on the estimated positions of the plurality of mirrors under the coordinate system, the virtual image locations, and the predetermined absolute and relative positions for each of the plurality of reflective mirrors.

* * * * *